United States Patent [19]

Ayaha

[11] 4,230,217
[45] Oct. 28, 1980

[54] BOTTLE ALIGNING MACHINE

[75] Inventor: Kyuhei Ayaha, Tokushima, Japan

[73] Assignee: Shikoku Kakooki Co., Ltd., Tokushima, Japan

[21] Appl. No.: 960,270

[22] Filed: Nov. 13, 1978

[30] Foreign Application Priority Data

Nov. 16, 1977 [JP] Japan .................... 52-154575[U]

[51] Int. Cl.³ ............................................. B65G 47/24
[52] U.S. Cl. ........................................................ 198/397
[58] Field of Search .............. 198/384, 392, 396, 397; 221/156, 163, 167

[56] References Cited

U.S. PATENT DOCUMENTS

| | | | |
|---|---|---|---|
| 3,543,909 | 12/1970 | Ueda | 198/392 |
| 3,650,368 | 3/1972 | Nalbach | 198/397 |
| 3,662,872 | 5/1972 | Nalbach | 198/397 |
| 4,130,194 | 12/1978 | Schindel et al. | 198/397 |

Primary Examiner—James L. Rowland.
Attorney, Agent, or Firm—Allison C. Collard; Thomas M. Galgano

[57] ABSTRACT

A machine includes a fixed outer cylinder having a cylindrical inner wall, a rotary inner cylinder coaxial with the inner wall, a conical bottle rolling table disposed inside the inner cylinder, a guide rail extending from the table along the inner periphery of the inner cylinder to a position thereabove, drive blades provided on the inner periphery of the inner cylinder, a bottle support secured to the outer periphery of the inner cylinder, a guide ring arranged above the bottle support between the inner wall and the inner cylinder, and bottle position adjusting guides provided on the outer periphery of the inner cylinder. Empty bottles are supplied to the table, and then raised along the guide rail to a position above the inner cylinder and pushed out in a horizontal position over the upper edge of the inner cylinder onto the guide ring and the position adjusting guides by the blades. The bottles are thereafter sent forward along the guide ring while being held in different positions in accordance with their orientation, dropped bottom down from the terminal end of the receiving means onto the support under gravity and sent out in a row with the mouth up to receive a liquid.

5 Claims, 3 Drawing Figures

FIG. 1.
FIG. 2.
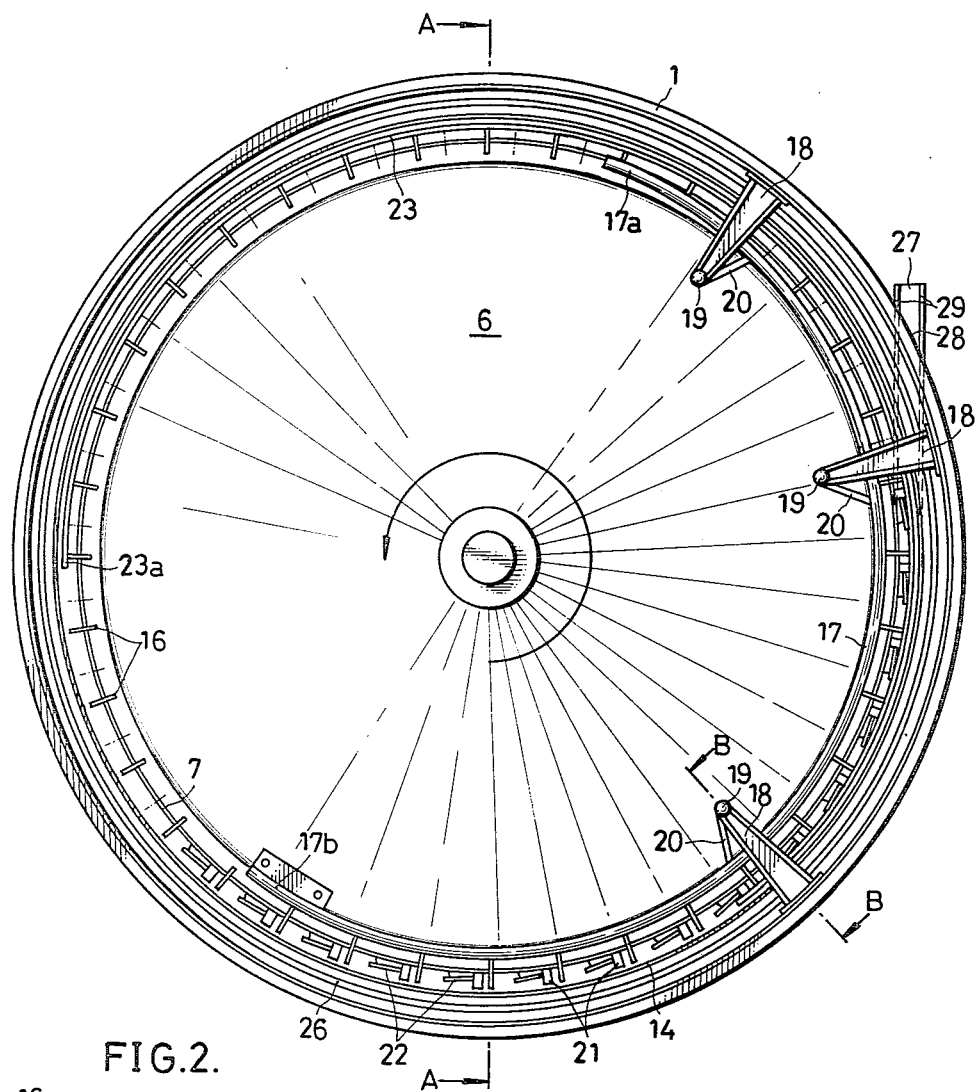
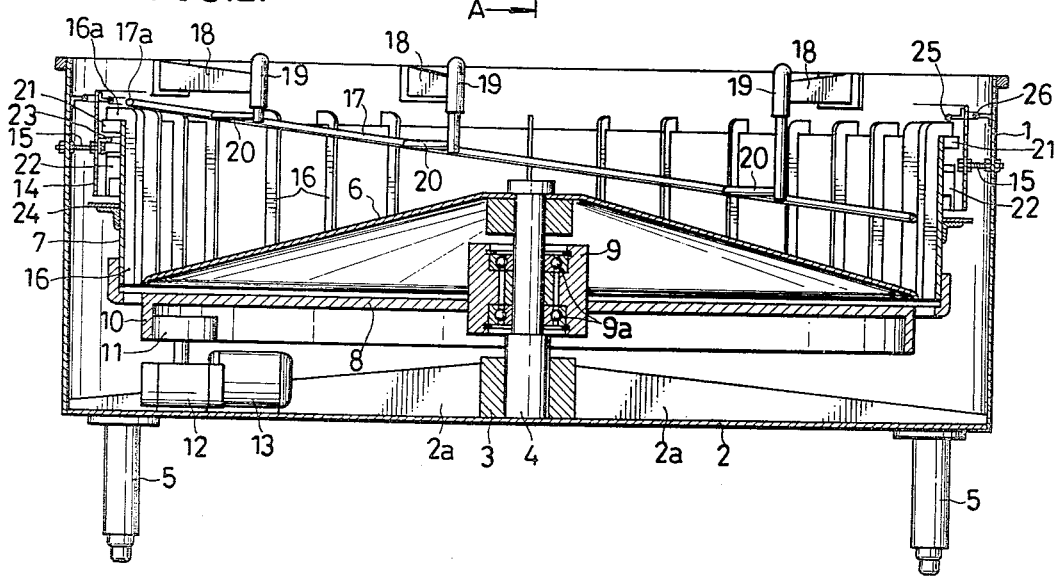

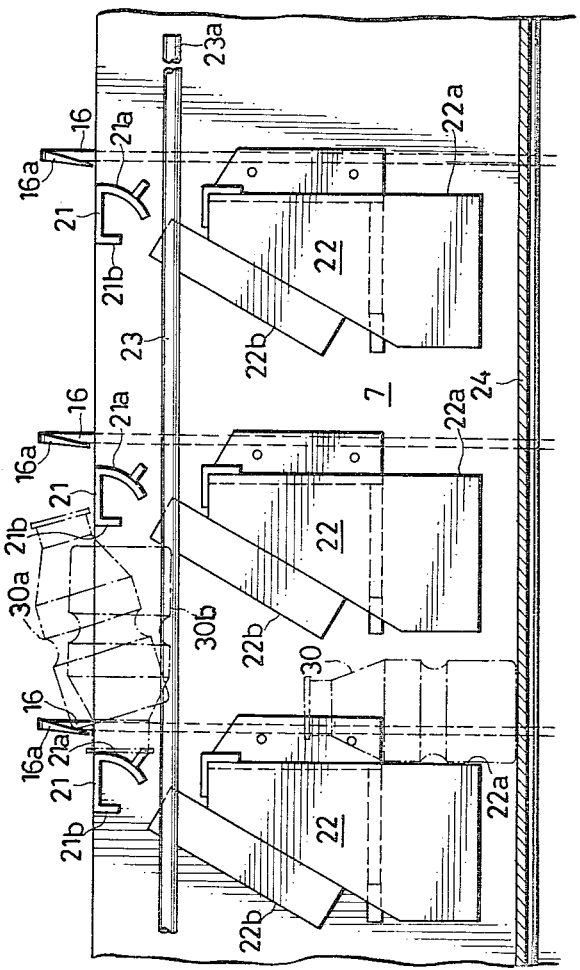
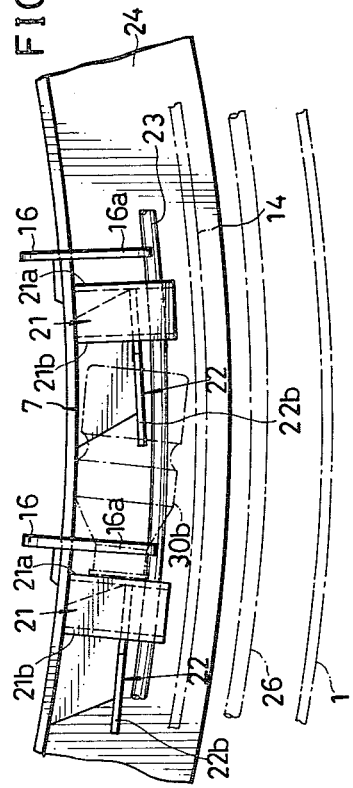
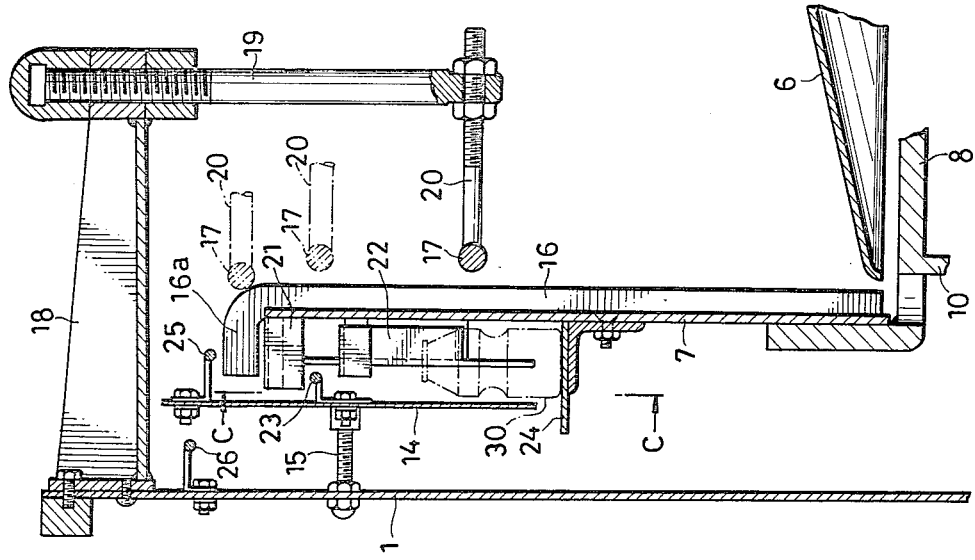

BOTTLE ALIGNING MACHINE

This invention relates to a bottle aligning machine for receiving empty bottles and feeding the bottles out in a row with the mouth up to receive a liquid.

The operation for filling bottles especially of synthetic resin with a liquid, particularly with milk or acidophilus beverage, is presently carried out automatically. Before the bottle filling operation, a large number of empty bottles must be arranged in a row with the mouth up. This operation is performed by a machine disposed between a bottle storage tank and the filling apparatus.

Bottle aligning machines heretofore known include one which is not provided with a limit switch for detecting the orientation of the mouth of bottles as disclosed in U.S. Pat. No. 3,543,909. The disclosed machine comprises a fixed housing having an inner cylindrical wall, rotary inner cylinder coaxial with the inner cylindrical wall, bottle guide means for raising the bottles fed to the inner cylinder to a position above the inner cylinder and pushing out the bottles over the upper edge of the inner cylinder, and clearing means and engaging means for dropping the pushed-out bottles with the bottom down onto specified positions by the action of gravity. However, since synthetic resin bottles are very lightweight and tend to jump, bottles will bounce when passing over the upper edge of the inner cylinder and will not be properly positioned if the inner cylinder is driven at a high speed, although such misalignment is avoidable at a low speed of rotation. Thus the machine has the drawback of being inefficient in that the inner cylinder is not rotatable at an increased speed.

An object of this invention is to provide a machine which is capable of automatically efficiently feeding bottles out in a row with the mouth up without using any limit switch and which is operable with a reduced likelihood of trouble.

Another object of this invention is to provide a machine by which bottles can be positioned upright with the mouth up by the action of gravity to eliminate the damage that would result when bottles are forcibly oriented.

Another object of this invention is to provide a machine of increased capacity.

These and other objects of this invention can be achieved by a bottle aligning machine comprising a fixed outer cylinder having a cylindrical inner wall, a rotary inner cylinder coaxial with the inner cylindrical wall, a conical bottle rolling table disposed inside the inner cylinder for receiving the bottles supplied to the inner cylinder from above, bottle guide means extending from the bottle rolling table along the inner periphery of the inner cylinder to a position thereabove, bottle delivering means provided on the inner periphery of the inner cylinder for raising bottles along the bottle guide means to a position above the inner cylinder and pushing out the bottles in a horizontal position over the upper edge of the inner cylinder, intermediate bottle receiving means arranged between the cylindrical inner wall and the inner cylinder for receiving the bottles pushed out from the inner cylinder, a bottle support secured to the outer periphery of the inner cylinder, and bottle position adjusting means provided on the outer periphery of the inner cylinder for moving the bottle forward along the intermediate bottle receiving means and dropping the bottle bottom down from the terminal end of the intermediate bottle receiving means onto the bottle support.

Other objects, features and advantages of this invention will become fully understood from the following detailed description given with reference to the accompanying drawings in which:

FIG. 1 is a plan view showing a machine embodying this invention with an outer cylinder cover and a bottle feeding chute removed therefrom;

FIG. 2 is a view in section taken along the line A—A in FIG. 1;

FIG. 3 is an enlarged view in section taken along the line B—B in FIG. 1;

FIG. 4 is a view in section taken along the line C—C in FIG. 3; and

FIG. 5 is a plan view of FIG. 4.

With reference to FIGS. 1 and 2, the machine includes a fixed outer cylinder 1 serving as a housing, a rotary inner cylinder 7 concentric with the outer cylinder 1 and having a smaller diameter than the outer cylinder 1, and a conical bottle rolling table 6 disposed inside the inner cylinder 7. Although not shown, the upper end opening of the outer cylinder 1 is covered with a detachable cover, which is provided with a bottle feeding chute positioned some distance away from the center of the cover and extending obliquely downward into the interior of the inner cylinder 7. The outer cylinder 1 is fixedly provided with a bottle frame 2 including radial ribs 2a and having a boss 3 in its center. A vertical shaft 4 is fixed to the boss 3. Legs 5 are attached to the under side of the bottom frame 2.

A bottle rolling table 6 is secured, at its center top portion, to the upper end of the vertical shaft 4. The table 6 slopes toward its peripheral edge in the form of a cone so that the bottles placed thereon from the feeding chute will roll down toward the peripheral edge. The peripheral edge is spaced from the inner peripheral surface of the inner cylinder 7 by a distance substantially equal to the radius of the body of the bottle.

The rotary inner cylinder 7 has a bottom frame 8 provided in its center with a boss 9 which is mounted on the vertical shaft 4 by bearings 9a. A friction roller 11 is elastically in contact with the inner periphery of a ring 10 projecting from the lower side periphery of the inner cylinder bottom frame 8. The friction roller 11 is coupled to a motor 13 by way of a reduction gear 12. The reduction gear 12 and motor 13 are mounted on the upper side of the bottom frame 2 of the outer cylinder 1. The inner cylinder 7 is driven by the motor 13 in a counterclockwise direction when seen in plan. Throughout the specification and the appended claims, the term "front" or "forward" refers to the direction of rotation of the inner cylinder 7, and the term "rear" or "rearward" to the direction opposite thereto.

As will be apparent from FIGS. 1 to 3, a cylindrical partition 14 provided between the outer cylinder 1 and the inner cylinder 7 is concentric with the inner cylinder 7. The partition 14 is held in position by bolts 15 on the peripheral wall of the outer cylinder 1. The inner peripheral surface of the partition 14 is spaced from the outer peripheral surface of the inner cylinder 7 by a distance slightly larger than the diameter of the body of the bottle.

A helical slanting guide rail 17 extends along the inner periphery of the inner cylinder 7. The guide rail 17 which serves to guide bottles is circular in cross section and has a length larger than one half of a circle when seen in plan. The guide rail 17 has a flat lower end 17b attached to an outer peripheral upper surface portion of the rolling table 6. From this position, the rail 17 extends helically upward in the direction of rotation of the inner cylinder 7, terminating at an upper end 17a. The upper end 17a extends beyond the upper ends of the inner drive blades 16 to be described below to a position above the upper edge of the inner cylinder 7. The guide rail 17 and the inner peripheral surface of the inner cylinder 7 are spaced by a distance slightly smaller than the diameter of the body of the bottle so as to retain bottles therebetween. Each of hangers 18 attached to the upper and inner periphery of the outer cylinder 1 is provided at its inner end with a hanger bolt 19 the lower end of which supports the guide rail 17 by a holding rod 20. Thus the guide rail 17 is suspended from the hangers 18 so as not to interfere with the rotation of the inner cylinder 7.

A large number of radial inner drive blades 16 spaced apart by a distance slightly larger than the length of the bottle are secured to the inner periphery of the inner cylinder 7. The inner drive blades 16 serve as bottle delivering means by which the bottles fed to the bottle rolling table 6 are raised along the guide rail 17 to a position above the inner cylinder 7 and pushed out in a horizontal position over the upper edge of the cylinder 7. Each of the drive blades 16 has a width substantially equal to the radius of the bottle. The blade 16 has a lower end positioned approximately at the same level as the outer peripheral edge of the bottle rolling table 6 and an upper end projecting horizontally over the upper edge of the inner cylinder 7 radially outwardly thereof to provide an outward projection 16a slightly inclined rearward toward its lower extremity. The projection 16a serves as a portion of the bottle position adjusting means to be described later.

Disposed between the inner cylinder 7 and the partition 14 at a level lower than the upper edge of the inner cylinder 7 is a bottle guide ring 23 which is circular in cross section and in the form of a circular arc larger than one half of a circle when seen in plan. The guide ring 23 serves as intermediate bottle receiving means for receiving bottles pushed outward in a horizontal position from the inner cylinder 7. The upper end 17a of the guide rail 17 corresponds, in position, to an intermediate portion of the ring 23. The ring 23 is concentric with the inner cylinder 7 and is attached to the partition 14 as spaced from the outer peripheral surface of the cylinder 7 by a distance slightly smaller than the diameter of the body of the bottle so that bottles can be sent forward by the rotation of the inner cylinder 7 while being retained between the ring 23 and the outer peripheral surface of the inner cylinder 7.

The aforementioned bottle position adjusting means includes the outward projection 16a at the upper end of the inner drive blade 16 and a top guide 21 positioned to the front of the projection 16a and fixedly attached to the outer peripheral surface of the inner cylinder 7. The relation in position between the projection 16a and the guide ring 23 is so determined that when a bottle is on the guide ring 23, the projection 16a will permit the mouth of the bottle alone to pass thereunder but engage the bottom of the bottle only. The top of the guide 21 is planar and flush with the upper edge of the inner cylinder 7. The width of the top guides 21 in the direction of rotation of the inner cylinder and the position of the guides 21 are such that the distance between the rear end 21b of any top guide 21 and the projection 16a positioned immediately to the rear of that guide is slightly smaller than the length of the bottle and that the distance between the rear end 21b of a top guide and the front end 21a of the adjacent top guide 21 positioned immediately to the rear thereof is slightly greater than the length of the bottle. As apparent from FIG. 4, accordingly, a bottle 30a whose mouth faces the front comes into contact, at its bottom, with the projection 16a, with its mouth outer periphery caught by the rear end 21b of the top guide 21, with the result that a portion of its bottom outer periphery alone is in point contact with the guide ring 23. In the case of a bottle 30b whose mouth faces the rear, the mouth passes through the space between the projection 16a and the guide ring 23 and comes into contact with the front end 21a of the top guide 21, while the bottle body comes into line contact with the guide ring 23. In either case, the bottle is sent forward slidingly on the ring 23 by the rotation of the inner cylinder 7 and thereafter falls from the terminal end 23a of the guide ring 23 with its bottom down.

A horizontal annular bottle support 24 is fixedly attached to the outer periphery of the inner cylinder 7 at a level slightly below the lower edge of the cylindrical partition 14. Provided between the top guides 21 and the bottle support 24 are bottle aligning guides 22 secured to the outer periphery of the inner cylinder 7 and arranged at the same spacing as the top guide. As seen in FIG. 4, the bottle aligning guide 22 comprises a front vertical guide portion 22a and a rear slanting guide portion 22b. The vertical guide portion 22a is positioned in a vertical plane containing the front end 21a of the top guide 21. The slanting guide portion 22b is so positioned that the upper end thereof is located slightly rearward from the rear end 21b of the top guide 21 and slightly above the guide ring 23, the lower end of the slanting guide portion 22b being spaced apart from the vertical guide portion 22a disposed immediately to the rear thereof by a distance slightly larger than the diameter of the body of the bottle.

Two baffle rings 25 and 26 are attached to an upper end inside portion of the partition 14 and to an upper end inside portion of the outer cylinder 1 respectively.

A bottle outlet 28 formed in the outer cylinder 1 is provided with a bottle discharge channel 27 continuous with the bottle support 24. Guide plates 29 are provided on the opposite sides of the discharge channel 27 for transferring bottles 30 from the support 24 to the discharge channel 27 and guiding them to the outlet 28.

The machine described above operates in the following manner. A large number of bottles are placed into the inner cylinder 7 through the feeding chute. The bottles fall onto the bottle rolling table 6 first and roll down the slope to its peripheral edge, where the bottles are automatically trapped in the spaces between the inner drive blades 16 of the inner cylinder 7. They are pushed forward in a counterclockwise direction in FIG. 1 by being engaged at the bottom or mouth by the lower ends of the blades 16. Thus the bottles are sent forward to the lower end 17b of the guide rail 17. Since the guide rail 17 extends helically along the row of drive blades 16 which are revolving, the bottles are forced up by the blades 16 along the rail 17 and reach the upper end 17a. Since the upper end 17a of the guide rail 17 extends outward, the bottles pass over the upper edge of the inner cylinder 7 outward and fall. At this time, the bottles ascending the guide rail 17 in an upright position are all dropped off the rail on contact with the baffle ring 25 before passing over the upper edge of the cylinder 7. Thus the bottles ascending the guide rail 17 in a horizontal position alone move over the inner cylinder 7 outwardly thereof and fall. The bottles include those whose mouths face the front as indicated at 30a and those whose mouths face the rear as at 30b.

The bottle whose mouth faces the front ascends with its bottom in contact with the front surface of the blade 16, passes over the upper edge of the inner cylinder 7, and comes into contact, at its bottom, with the projection 16a of the blade 16, with the mouth edge of the bottle caught by the rear end 21b of the top guide 21. The bottle is now in an inclined position in which a portion of the bottom periphery thereof only is in point contact with the guide ring 23 as seen in FIG. 4. The bottle in this position slides on the guide ring 23 and reaches the terminal end 23a. Upon the bottom of the bottle 30a passing the end 23a, the bottle, now unsupported, slides down the slanting guide portion 22b of the aligning guide 22 with its bottom down, is brought to an upright position by contact with the vertical guide portions 22a of the rear adjacent aligning guide 22, falls onto the support 24 with the mouth up and then rests thereon. The presence of the aligning guide 22 and the partition 14 provided outside the inner cylinder assures that the bottles will be smoothly properly placed in an upright position even when made of paper or plastic resin and smooth-surfaced and therefore liable to jump on striking against articles.

On the other hand, the bottle 30b whose mouth faces the rear ascends with its mouth end in contact with the front surface of the blade 16 and passes over the upper edge of the inner cylinder 7, whereupon the mouth passes between the projection 16a and the guide ring 23 and comes into contact with the front end 21a of the top guide 21 to the rear of that projection 16a without being caught by the projection. The bottle is now in a horizontal position with its body in line contact with the guide ring 23. The bottle 30b in this state is sent forward on the guide ring 23. Upon the bottom of the bottle passing the terminal end 23a of the guide ring 23, the bottle 30b falls under gravity with its bottom down, coming into contact with and sliding down the slanting guide portion 22b of the aligning guide 22. The bottle is brought to an upright position further by contact with the vertical guide portion 22a of the guide 22. Consequently the bottle is placed on the support 24 in an upright position.

In either of the above two cases, the bottle becomes more likely to jump when falling after passing over the upper edge of the inner cylinder 7 outwardly thereof and consequently fails to settle on the guide ring 23 immediately thereafter, if the inner cylinder is driven at an increased speed. However, the bottle can be brought to rest on the guide ring 23 before reaching the terminal end 23a when the guide ring 23 has a suitable length from the position where the bottle falls to the terminal end 23a of the ring, whereby misalignment of bottles is avoidable even if the inner cylinder 7 is driven at a higher speed. With the machine of this invention, the bottle passing over the upper edge of the inner cylinder 7 is received by the intermediate bottle receiving means first and then sent forward before falling onto the bottle support 24 and is thereafter allowed to fall onto the support 24. This renders the inner cylinder 7 rotatable at an increased speed without entailing misalignment and results in an improved efficiency.

The bottles thus aligned on the support 24 are sent forward in a counterclockwise direction in FIG. 1 with the rotation of the support 24 and brought into contact with the guide plate 29, whereupon they are transferred to the discharge channel 27 and then run off from the outlet 28.

What is claimed is:

1. In a machine for receiving empty bottles and feeding the bottles out in a row with the mouth up to receive a liquid of the type including:
    a fixed outer cylinder (1) having a cylindrical inner wall;
    a rotary inner cylinder (7) coaxial with the cylindrical inner wall;
    a conical bottle rolling table (6) disposed inside the cylinder for receiving the bottles supplied to the inner cylinder from above;
    bottle guiding means extending from the bottle rolling table (6) along the inner periphery of the inner cylinder (7) to a position thereabove;
    bottle delivering means provided on the inner periphery of the inner cylinder (7) for raising the bottles along the bottle guiding means to a position above the inner cylinder (7) and pushing out the bottles in a horizontal position over the upper edge of the inner cylinder (7);
    a bottle support (24) secured to the outer periphery of the inner cylinder (7); and
    means for dropping the bottles pushed out from the inner cylinder, bottom down under gravity onto the bottle support;
    the improvement comprising:
    said means for dropping the bottles onto the bottle support (24) includes intermediate bottle receiving means arranged above the bottle support (24) between the cylindrical inner wall and the inner cylinder (7) for receiving and guiding the bottles pushed out from the inner cylinder (7) in a horizontal position, and bottle position and adjusting means provided on the outer periphery of the inner cylinder (7) for moving the bottles forward along the intermediate bottle receiving means while holding them in different positions in accordance with their orientation, and dropping them bottom down from the terminal end of the intermediate bottle receiving means onto the bottle support (24).

2. A machine as defined in claim 1 wherein the cylindrical wall is the wall of a cylindrical partition (14) disposed inside and attached adjustably to the outer cylinder (1).

3. A machine as defined in claim 1 wherein the bottle guide means is a helical rail (17) having an upper end extending above the upper edge of the inner cylinder (7), and the bottle delivering means comprises drive blades (16) arranged radially and spaced apart by a distance larger than the axial length of the bottles.

4. A machine as defined in claim 1 wherein the intermediate bottle receiving means is a circular arc ring (23) concentric with the inner cylinder (7).

5. A machine as defined in claim (4) wherein the position adjusting means comprises a projection (16a) continuous with the bottle delivering means and extending radially outward over the upper edge of the inner cylinder (7) and a top guide (21) having a planar top surface and positioned to the front of the projection (16a) toward the direction of rotation of the inner cylinder (7), the projection (16a) permitting the mouth of the bottle alone to pass thereunder and being engageable with the bottom of the bottle only, the top guide (21) having a rear end (21b) spaced from the projection (16a) by a distance larger than the axial length of the bottle and engageable with the mouth outer periphery of a bottle opened toward the direction of the rotation, the top guide (21) further having a front end (21a) engageable with the mouth of a bottle opened toward a direction opposite to the direction of the rotation.

* * * * *

UNITED STATES PATENT AND TRADEMARK OFFICE
CERTIFICATE OF CORRECTION

PATENT NO. : 4,230,217
DATED : OCTOBER 28, 1980
INVENTOR(S) : KYUHEI AYAHA

It is certified that error appears in the above—identified patent and that said Letters Patent is hereby corrected as shown below:

Column 6, line 63, change "larger" to --smaller--.

Signed and Sealed this

Seventh Day of April 1981

[SEAL]

Attest:

RENE D. TEGTMEYER

Attesting Officer    Acting Commissioner of Patents and Trademarks